United States Patent
Murri et al.

(10) Patent No.: US 8,036,643 B2
(45) Date of Patent: *Oct. 11, 2011

(54) METHOD AND DEVICE FOR HANDLING TELEPHONE CALLS DIRECTED TO NON-REACHABLE MOBILE PHONES

(75) Inventors: Paolo Murri, Rome (IT); Mario Bizzi, Rome (IT); Michele Palermo, Rome (IT)

(73) Assignee: Telecom Italia S.p.A., Milan (IT)

(*) Notice: Subject to any disclaimer, the term of this patent is extended or adjusted under 35 U.S.C. 154(b) by 834 days.

This patent is subject to a terminal disclaimer.

(21) Appl. No.: 12/071,086

(22) Filed: Feb. 15, 2008

(65) Prior Publication Data

US 2008/0207174 A1 Aug. 28, 2008

Related U.S. Application Data

(63) Continuation of application No. 10/450,673, filed as application No. PCT/IT01/00625 on Dec. 11, 2001, now Pat. No. 7,349,687.

(30) Foreign Application Priority Data

Dec. 22, 2000 (IT) .............................. RM2000A0690

(51) Int. Cl.
   *H04W 1/725* (2006.01)
(52) U.S. Cl. .................. 455/412.2; 455/414.1; 455/567; 455/566; 455/414.2; 455/418; 455/413; 455/458; 455/421
(58) Field of Classification Search ............... 455/412.2, 455/414.2, 567, 566, 414.1, 418, 421, 413, 455/415, 458
See application file for complete search history.

(56) References Cited

U.S. PATENT DOCUMENTS

| | | | |
|---|---|---|---|
| 5,819,177 A | 10/1998 | Vucetic et al. | |
| 5,878,354 A * | 3/1999 | Hasegawa | 455/567 |
| 5,915,222 A | 6/1999 | Olsson et al. | |
| 6,006,087 A | 12/1999 | Amin | |
| 6,163,691 A | 12/2000 | Buettner et al. | |
| 6,311,057 B1 * | 10/2001 | Barvesten | 455/415 |
| 6,882,860 B1 * | 4/2005 | Kim | 455/553.1 |
| 7,349,687 B2 * | 3/2008 | Murri et al. | 455/415 |
| 7,937,116 B2 * | 5/2011 | Sano | 455/567 |
| 2001/0012347 A1 | 8/2001 | Fujino et al. | |

FOREIGN PATENT DOCUMENTS

| | | |
|---|---|---|
| EP | 0 699 009 | 2/1996 |
| HU | 221 940 | 12/1999 |
| JP | 6-165247 | 6/1994 |

(Continued)

*Primary Examiner* — Kwasi Karikari
(74) *Attorney, Agent, or Firm* — Finnegan, Henderson, Farabow, Garrett & Dunner, L.L.P.

(57) ABSTRACT

A method for handling telephone calls directed to a non-reachable mobile phone, and for handling data pertaining to them, wherein: I—provided the call diversion service to a different number, or the answering service, have not been enabled, the phone call is routed towards a phone call data management and storage device, when the mobile phone called user is non-reachable, dut to the fact that is in the detach mode or is temporarily out of the range reachable by radio-frequency signals; II—at the time mobile phone is again reachable, a notification is transmitted to the subscriber number of the telephone call; the notification being effected in the form of SMS, which contain phone call data of missed phone calls performed during the period while the mobile phone was not reachable.

4 Claims, 3 Drawing Sheets

FOREIGN PATENT DOCUMENTS

| | | |
|---|---|---|
| JP | 8-204811 | 8/1996 |
| JP | 10/004574 | 1/1998 |
| JP | 11/511608 | 10/1999 |
| JP | 11-308668 | 11/1999 |
| WO | WO 92/14330 | 8/1992 |
| WO | WO 97/08906 | 3/1997 |
| WO | WO 97/50224 | 12/1997 |
| WO | WO 98/17074 | 4/1998 |

* cited by examiner

METHOD AND DEVICE FOR HANDLING TELEPHONE CALLS DIRECTED TO NON-REACHABLE MOBILE PHONES

This is a continuation of application Ser. No. 10/450,673, filed Jun. 17, 2003, now U.S. Pat. No. 7,349,687, which was a national phase application of International Patent Application No. PCT/IT01/00625, filed Dec. 11, 2001, in the European Patent Office, all of which are incorporated herein by reference.

FIELD OF THE INVENTION

The present invention generally refers to the problem of establishing a communication with a subscriber in a cellular radio mobile network, and more particularly it relates to a telecommunication service through a cellular radio mobile network, which allows a subscriber to acquire the telephone number of the subscriber who tried to call him while he was not reachable due to radio signalling absence, or because the mobile phone was in the detach mode. The invention is concerned both with the method for implementing this service and with the functions of special devices employed when providing the same.

BACKGROUND ART

Recent estimates suggest that for every telephone network dealer, who at present is concerned with the public radio mobile service in Italy, there are daily tens of a million telephone calls which are unsuccessful because the "target" mobile phone is not reachable or is in the detach mode.

In other words, notwithstanding the increased use of telephone answering systems (answering services), and call diversion services, it nevertheless happens, that in some special conditions, more than 400 calls/second are missed, thereby limiting the extent of outgoing traffic or, in any case, providing a restricted or partially complete service to subscribers.

The basic difficulty found by a network administrator when tackling this kind of problem, is that of getting through a considerable traffic.

In fact, the problem of the recording and management—at the same time—of such a noticeable amount of data due to the high number of unsuccessful calls, the difficulties caused by a consistent evaluation of the geographical load of this service, the management of possible network failures, etc., have led to the situation that—up to now—a solution to this problem has neither been considered nor put into practice.

This problem does not lend itself to a simple solution, since many reasons may be the cause for the impossibility of establishing a communication:
  the radio mobile phone may be in the detach mode, the network having acquired the signal which confirms this fact (detach);
  the battery is discharged or is disconnected from its operative position, or the SIM card is off;
  a condition may exist wherein the transceiver station is not reachable or not visible, as the radio channel is notoriously very aleatory; etc.

At last, it would be necessary—in any case—to verify the possible enabling of the call diversion service to the answering system or to a further telephone number.

On the other hand, these conditions according to which it is impossible to reach a called subscriber, have till now been accepted by the users of the radio mobile service as intrinsically foreseeable but totally inevitable. In other words, this problem relating to the impossibility of establishing a connection has never been posed, because in comparison with the fixed network it was evident that the cellular telephone network would necessarily lead to this drawback, due to the intrinsic nature of the principle of operation of a mobile phone, which could momentarily be non reachable or in the detach mode.

An object of the present invention is to provide handling procedures for managing telephone calls directed to a radio mobile phone, which allow to improve the service, by eliminating the drawbacks due to communication barriers caused by the problem of a "non-reachable mobile phone".

A further object of the present invention is to increase the number of free basic services offered to the users by the network dealer.

A last object of the present invention is to provide a method for handling calls to a non-reachable radio mobile phone, and for handling the related, acquired information, the method employing standard protocols, technologies and components in the field of cellular radio mobile phones, in order to permit easy maintenance and reduce the cost of the method implementation.

DISCLOSURE OF INVENTION

These and further objects which will be apparent from the description, are obtained through a method for handling telephone calls directed to a non-reachable radio mobile phone and for handling information associated to the calling subscriber (like telephone number, time of the telephone call, and any additional information), wherein the method is started (triggered) by an event such as a vocal call, which in turn originates a notification through a recordable SMS text channel, and comprises the two distinct basic steps of:
I) routing the telephone call to a device for storage and management of data (information) relating to the phone call, when the called subscriber is not reachable, due to the subscriber mobile phone being in the detach mode or due to the absence of a radio-frequency signal, and when, at the same time, the call diversion service towards the answering service or another phone number is not operative;
II) transmitting, that is notifying, to the called subscriber, at the moment the mobile phone is reachable again, all SMS texts including data relating to the calls missed in the period when the subscriber was not reachable;
the method being based on a protocol, in which the usual steps sequence for performing a mobile telephone network call, is first started and thereafter immediately interrupted after the signaling and acquisition of the subscriber identification, and this steps sequence is resumed at the time it has been ascertained that the cellular radio mobile phone is reachable again, but actuating this time an SMS text channel, so as to completely eliminate the actual serial operative step sequence (transaction) typical of a voice communication protocol, thereby producing, in fact, a traffic having a virtual nature.

The method disclosed herein is basically different from the known telephone call diversion to the answering service, which involves in any case a complete serial operative calling and answering step sequence (transaction) and therefore a cost for the user, which depends from the time period during which the channel is engaged. The service has been realized using TACS, GSM, or GPRS technology, and it could also be realized by employing UMTS technology.

As far as the user is concerned, this service works according to the following steps:
  If a user is called while he is not reachable (cellular mobile phone in detached mode, or absence of radio-frequency signal), the calling user receives a vocal message informing him about the fact that the called user cannot be reached (this service is automatic, without any sort of control option being performed by the calling user).

Immediately after the called user is reachable again, he receives an SMS notification, including an indication of all telephone calls missed during the period while he was not reachable. The notification is sent by means of an SMS text to the owners of a GSM radio mobile phone, and to the owners of TACS radio mobile phones adapted to receive and transmit SMS text messages, whereas the notification is sent in the form of vocal SMS in case of TACS users whose cellular radio mobile phone is not adapted to handle SMS text. The phone number of the calling subscriber, the time of the telephone call, and any other relevant information relating to the calling subscriber and/or the called subscriber are transmitted at the same time. In case a user (with the same phone number) has called several times, only an indication pertaining to the most recent phone call will be provided. Moreover, if the number of missed telephone calls exceeds the available space in a single SMS, further SMS will be sent. The information concerning missed telephone calls may be stored only for a maximum predetermined time period.

The service is not actuated in the following circumstances:
The call diversion service is already active, towards an answering system or towards a different phone number;
The phone number of the calling user is not available or is not presented (e.g. a phone call from abroad, or in case of a hidden number, etc.)
The called user is roaming abroad.

BRIEF DESCRIPTION OF DRAWINGS

Preferred embodiments of the invention are described in the following for illustrative purposes only, without limiting the generality and possible applications thereof, said embodiments being shown in the annexed figures, in which.

BEST MODES OF CARRYING OUT THE INVENTION

It is now useful, before starting with the detailed description, to preliminarily introduce a list of symbologies and abbreviations actually in use in the technical field to which the invention refers.
1. DETACH: the user has turned off his radio mobile cellular phone by pushing the "OFF" key.
2. HLR Home Location Register: Database containing data relating to registered cellular phones.
3. IMSI: radio mobile identity of the SIM card.
4. IP: network address defined in the Internet protocol.
5. IAM Initial Address Message: Signaling message containing information relating to the calling/called person.
6. ISUP ISDN User Part: GSM network signaling.
7. MAP Mobil Application Part: it denotes (when MAP GSM is implied) the protocol used by the nodes of the GSM network to manage the users mobility.
8. MSC mobile switching center: switching center for mobile telephony
9. MSISDN Mobil Station Integrated Service Digital Network: it denotes the number of the mobile phone (e.g. 0338 451845)
10. PAGING: a radio signal diffused from the MSC/VLR to inform the radio mobile phone that a call has arrived.
11. PLMN: Public Land Mobile Network
12. PSTN: Public Switch Telephone Network
13. ROAMING: denotes a condition wherein a GSM mobile phone happens to be connected to a network which differs from the network which issued the GSM card of the mobile phone.
14. SMS-C: service center for short messages
15. STP Signaling Transfer Protocol: it denotes a function of the signaling telephone network, which allows to transfer a signaling message to its destination, passing through intermediate nodes.
16. TGDS TACS/GSM Gateway Delivery System: Multifunctional Hardware and Software Platform, implemented for integration of wireless message systems operative procedures.
17. UCP Universal Computer Protocol: Protocol used in the data transmission towards the service center SMS-C
18. VLR Visitor Location Register: database containing information relating to the actual position of the mobile phone.

Figure 1:
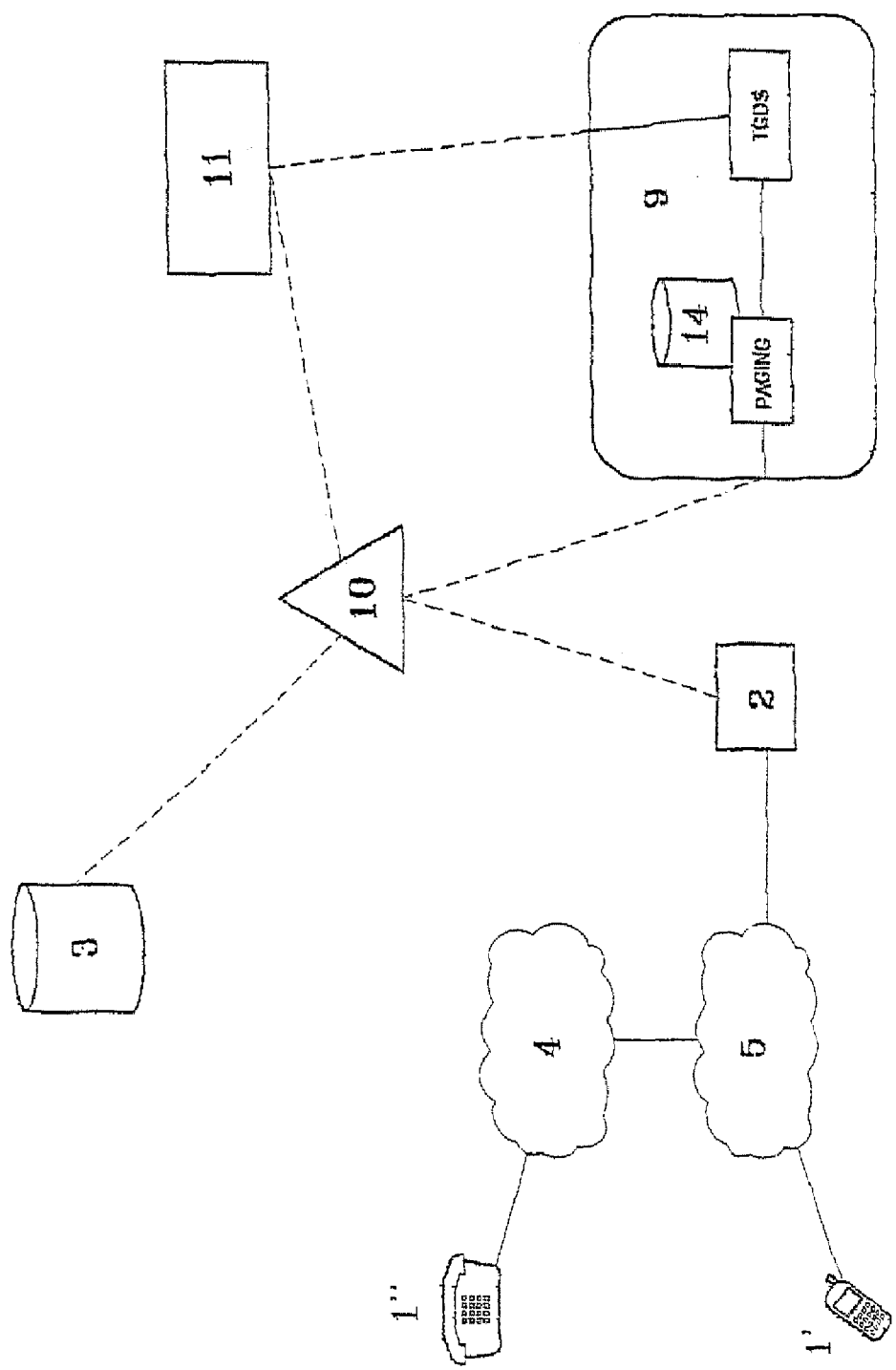
FIG. 1 is a schematic view of a network architecture, providing an indication of the method of operation of the present invention.
Figure 2:
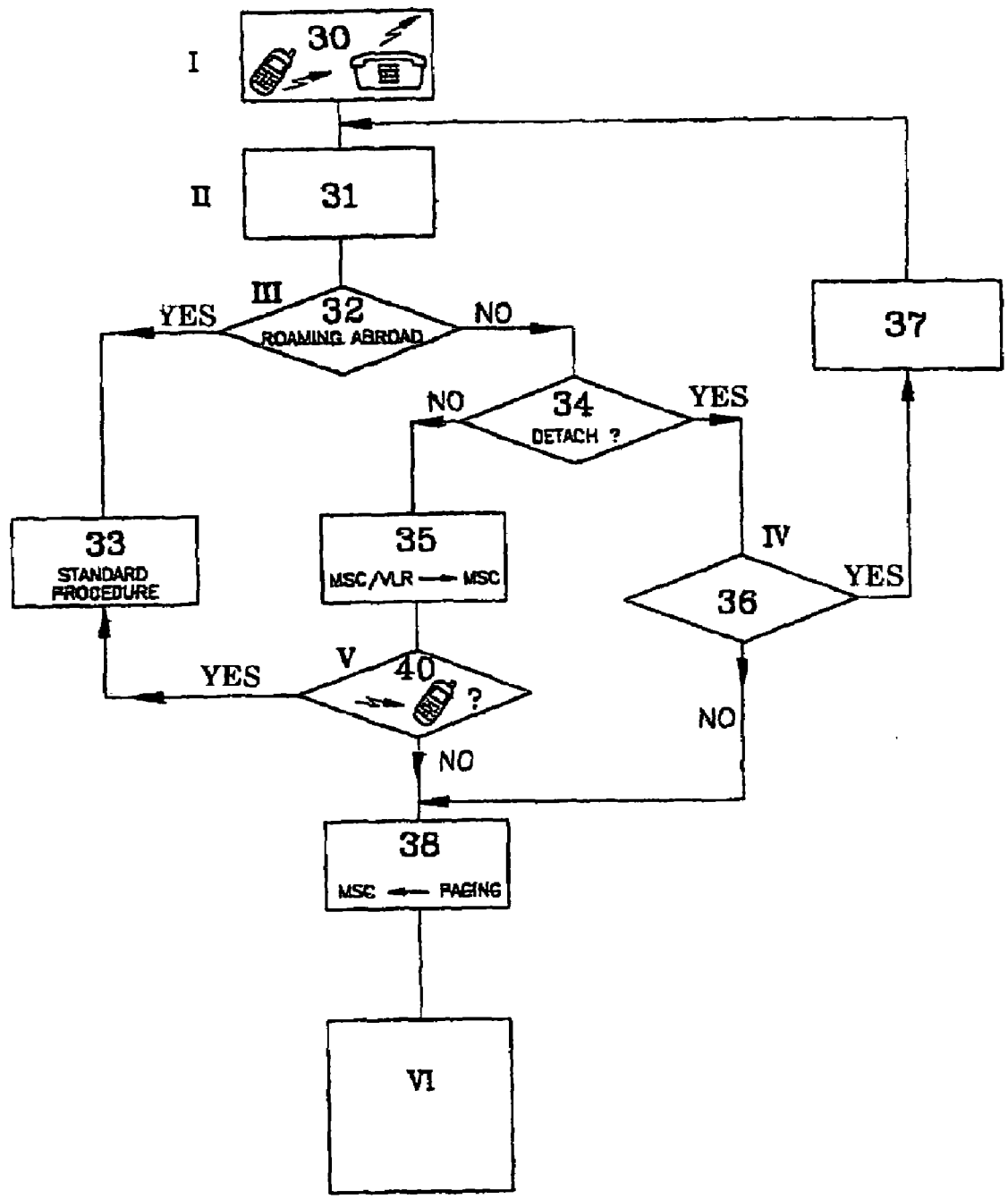
FIG. 2 is a block diagram of a fundamental procedure in the ambit of the method according to the present invention.
Figure 3:
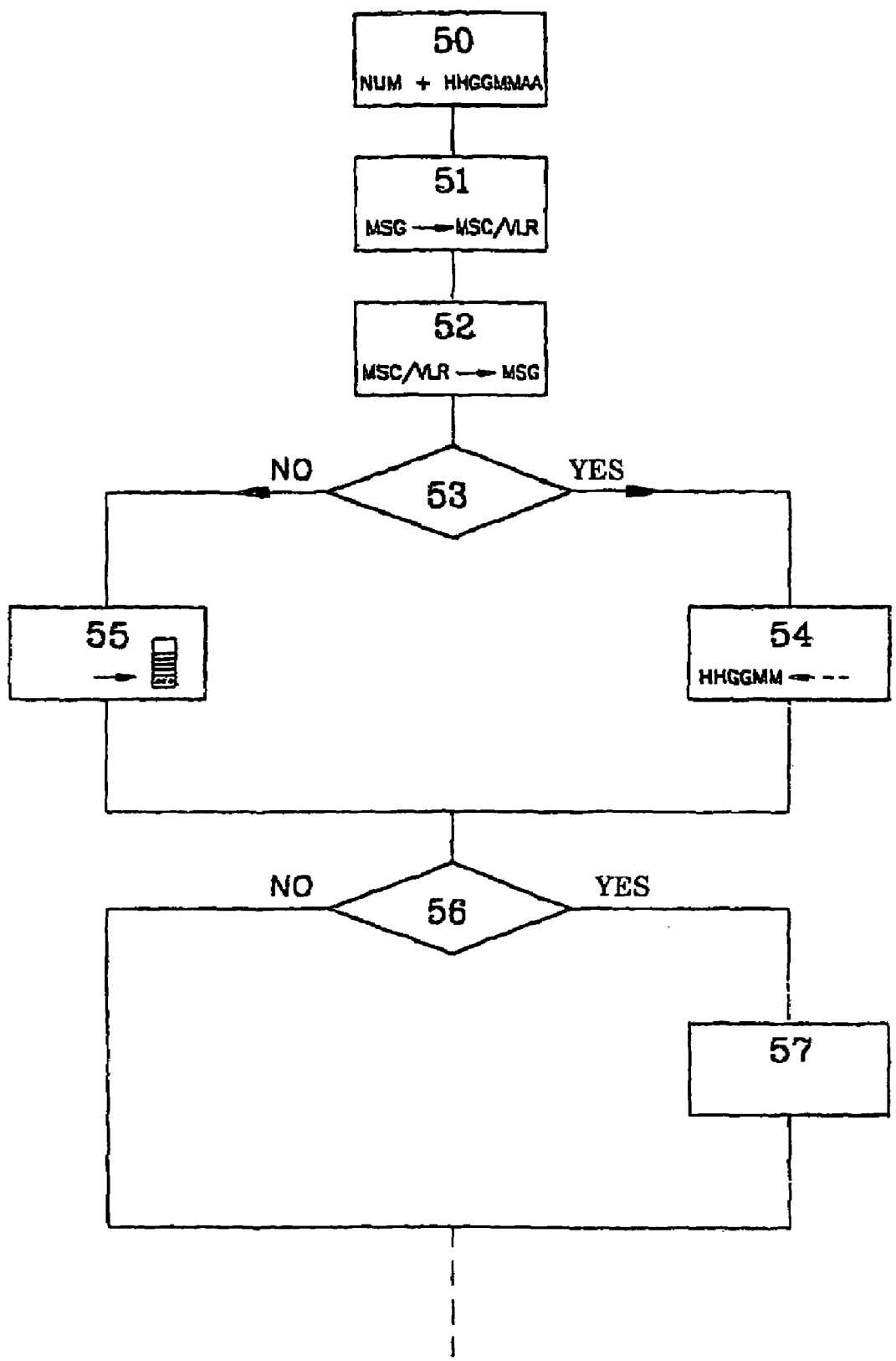
FIG. 3 is a block diagram illustrating a further essential procedure relating to the method of the present invention.

Referring now to FIG. 1, this figure schematically shows the architecture used for providing this service, with dotted lines indicating the functions of standard protocol stacks; on the other hand, FIGS. 2 and 3 denote the respective operative method used to carry out this service, which includes the following steps:

I) the calling subscriber 1', 1" dials (step 30) the destination or "target" number and performs his telephone call by interconnecting himself to a PSTN telephone network 4, in case the phone call is effected from a fixed line 1', or to the telephone network PLMN 5, in case the phone call is effected from a mobile phone 1", II) the original switching center MSC 2 interrogates the subscribers register 3 (hereafter HLR), at 31, by means of the STP 10, by asking the roaming destination number, III) the HLR 3 checks at 32 (based on the VLR number), if the mobile phone is roaming abroad (this step is valid only for the GSM network).
    if the answer is "YES", the phone call is handled according to the usual procedure 33 provided for in GSM networks,
    if the answer is "NO" the procedure continues through the steps described below, IV) the HLR 3 checks if the destination mobile phone is in the DETACH mode (34):

IV i) if the answer is "NO", it transmits (35) to the original switching center MSC 2, the roaming number of the center MSC/VLR in which the destination number is registered (destination center) and the method continues as described below in steps V and subsequent ones, which relate to checking if the mobile phone is reachable;

IV ii) if the answer is "YES", it is checked—at 36—if the destination number has enabled the call diversion service towards its own answering service or towards another phone number:
    if the answer is "YES", the number towards which the call diversion is active is returned (at 37) to the original exchange 2 (MSC), and the method proceeds by going back to step H;
    if the answer is "NO", the number of the device 9 for the storage and management of phone calls (hereafter also called "paging management") is returned (at 38) to the original exchange (MSC) 2, and then the method proceeds as described in step VI.

V In case the preliminary check on the DETACH mode of the mobile phone has led to a negative result, the destination center performs a further test 40 in order to establish if the destination ("target") mobile phone is reachable:

if the answer is "YES", the usual procedure for a phone call is started at 33, following the common procedure provided for in radio mobile phone systems.

if, on the other hand, the mobile phone is not reachable, a connection is established at 38, towards the number of the device 9 for the paging management, and the method proceeds according to the following step.

VI) If the mobile phone is turned off or is not reachable, and no call diversion is enabled, the calling user receives an announcement and the phone call is routed towards the device 9 for the paging management.

In order to increase the degree of reliability the design is realized in such a way as to use two nodes of paging management. Both nodes share the same Data Base 14 of the phone calls, which is duplicated in the respective sites. In order to manage correct synchronization and management of the two Data Base systems, and in order to avoid access conflicts on the same records (as would occur when two users call at the same time the same person whose mobile phone is turned off or not reachable by a radio-frequency signal), it was decided to define two series of different numbering on the HLR 3 for call-forwarding to the paging management device (these series are called "Call Forward Number MSISDN Paging__1" and "Call Forward Number MSISDN Paging__2"). The total number of numberings will be 10 (in order to leave a margin for possible future introductions of other paging management platforms), and they are formed by adding at the end of the numbering "47000", the last number of the MSISDN of the called user with respect to whom the service is made active. To this purpose, the paging management device 9, —that is the device for the storage and management of information relating to phone calls towards a non-reachable mobile phone—, satisfies a plurality of specific functional requirements which relate to the ability of cooperating, through the management of the protocol ISUP, with the switching nodes of the GSM network, and to the ability of extracting the calling number from the ISUP LAM message for the phone calls directed to a non-reachable mobile phone or in case of absence of a radio-frequency signal; furthermore there is provided the possibility of storing in a dedicated Data Base 14, all information related to phone calls directed to each mobile phone not reachable due to absence of radio frequency signal.

Moreover, the paging management device 9 is suited to cooperate with the HLR, through the management of the MAP protocol, for a switching request with regard to the return of momentarily non reachable mobile phones, inside the area reachable by radio-frequency signals. At last, it is also capable of interfacing itself, —through the management of the UCP protocol—, with the SMS service center 11 of the GSM switching center, in order to send text messages towards the mobile phones which have returned inside the area where radio-frequency signals are active.

On the other hand, under the aspect of the procedural realization of specific functions according to the present invention, the paging management device 9 successively performs the following operations:

I—It receives, at 50, only the signaling component of the phone call, it extracts the number of the calling subscriber from the LAM message of the ISUP signaling, it records the hour/date of the telephone call (with an accuracy of one second), and then it emits an appropriate deliver message (at 51) with respect to the MSC/VRL which is sending the data. This allows the MSC/VLR to possibly send a courtesy message (at 52), to the calling user, to deliver the phone call so as to release the phonic channel;

II—it activates a check at 53, in order to determine whether the calling number is already in the list of numbers that already tried to reach this particular subscriber; depending on the result of this check, it performs the following operations:

provided this number is already in the list of calling numbers for that subscriber, it replaces (at 54) the hour/date of the last phone call performed by this user number, with the hour/date recorded during the preceding step;

if, on the other hand, this number is not in the list of calling numbers for that subscriber, it adds this number to the list (at 55), together with an indication of the hour/date of the last telephone call;

III—if from a test 56, it follows that the phone call corresponds to a first phone call, directed to the called subscriber during the period when he was not reachable, a request is made (at 57) to the HLR 3 (through MAP SET MESSAGE WAITING DATA) to receive a notification immediately after the "target user", that is the subscriber, is again reachable.

When the addressee of the telephone call is again reachable, the HLR 3 communicates this fact to the paging management device 9. According to a preferred embodiment of the present invention, once the notification has been received, the paging management device subdivides the number list associated to the target mobile phone, into groups of four elements each, and for each of said groups it defines a text message to be sent to the user, containing information related to the phone calls comprised in this group.

The paging management device sends to the short message service center, 11, the above defined messages, through the UCP protocol, indicating as addressee the number of the destination (that is, target) mobile phone.

Finally, the SMS-C sends the messages to the destination mobile phone at the time it is reachable again.

The system that realizes the network architecture according to the above description is suited to provide a very high capacity of traffic management: it is able to manage 350 phone calls per second, and up to 10 millions phone calls per day.

These performances are obtained through a logical subdivision of the network load on a plurality of nodes and through the use of technologies, which are partly already known and already used in the field of telephony, but which are combined by means of the necessary implementations, extensions and modifications, so as to be able to finally provide the users with a new free service.

This service is already (default) enabled, although the user may request its deactivation by calling and dialing a new special option of a voice menu; subsequently, he can also request reactivation of this service, by performing similar actions.

The invention claimed is:

1. A method for handling a telephone call from a calling subscriber to a radio mobile phone of a called subscriber, the telephone call comprising a signaling component and a phonic channel, the method comprising the steps of:

I—determining if the called subscriber is not reachable, due to the mobile phone being in detach mode or due to absence of a radio frequency signal, and if a call diversion device towards an answering service or another phone number is not operative;

II—in the affirmative case, routing only the signaling component of the telephone call from a switching node to a device, distinct from the switching node, for storage and management of data relating to the telephone call;

III—at said storage and management device, extracting the telephone number of the calling subscriber from the routed signaling component of the telephone call, and recording in a number list said telephone number and the hour/date of the telephone call;

IV—emitting a deliver message from said storage and management device to said switching node, in order to allow said switching node to release the phonic channel of the telephone call;

V—determining, at said storage and management device, if the mobile phone of the called subscriber is reachable again;

VI—in the affirmative case, sending a message comprising said telephone number and said hour/date-of the telephone call, from said storage and management device to a SMS service center;

VII—transmitting from said SMS service center to the mobile phone of the called subscriber, a SMS message including said telephone number and said hour/date of the telephone call.

2. The method for handling a telephone call according to claim 1, characterized in that the recording in step III further comprises:

checking whether the telephone number of the calling subscriber is already included in said number list together with hour/date of a previous telephone call;

in the affirmative case, replacing, in the number list, the hour/date of said previous telephone call performed by said calling subscriber, with the hour/date of the telephone call;

in the negative case, adding the telephone number of the calling subscriber and the hour/date of the telephone call to said number list.

3. A mobile network comprising a HLR, a SMS center, a plurality of switching nodes and a device, distinct from the switching nodes, for the storage and management of data relating to a telephone call directed to a called mobile phone, when the latter is in the detach mode, or when a radio-frequency signal cannot reach said mobile phone, and when a call diversion device towards an answering service or another phone number is not operative, wherein the storage and management device is configured to:

cooperate with the switching nodes of the mobile network, and extract the telephone number of a calling subscriber from a signaling component of said telephone call, store and handle said extracted telephone number and the hour/date of the telephone call;

cooperate with the HLR of the mobile network, for performing a request of notification of a return of the called mobile phone within an area reachable by radio frequency signals;

cooperate with the SMS center of the mobile network, in order to send a SMS message to said called mobile phone returned within an area reachable by radio-frequency signals, said SMS message including said extracted telephone number and said hour/date of the telephone call.

4. A mobile network according to claim 3, wherein the telephone call comprises a signaling component and a phonic channel, and the storage and management device is configured to receive from the switching nodes of the mobile network only the signaling component of the telephone call and extract the telephone number of the calling subscriber from the received signaling component of the telephone call.

* * * * *